No. 874,401. PATENTED DEC. 24, 1907.
F. GREINER.
BALL BEARING.
APPLICATION FILED JULY 23, 1907.
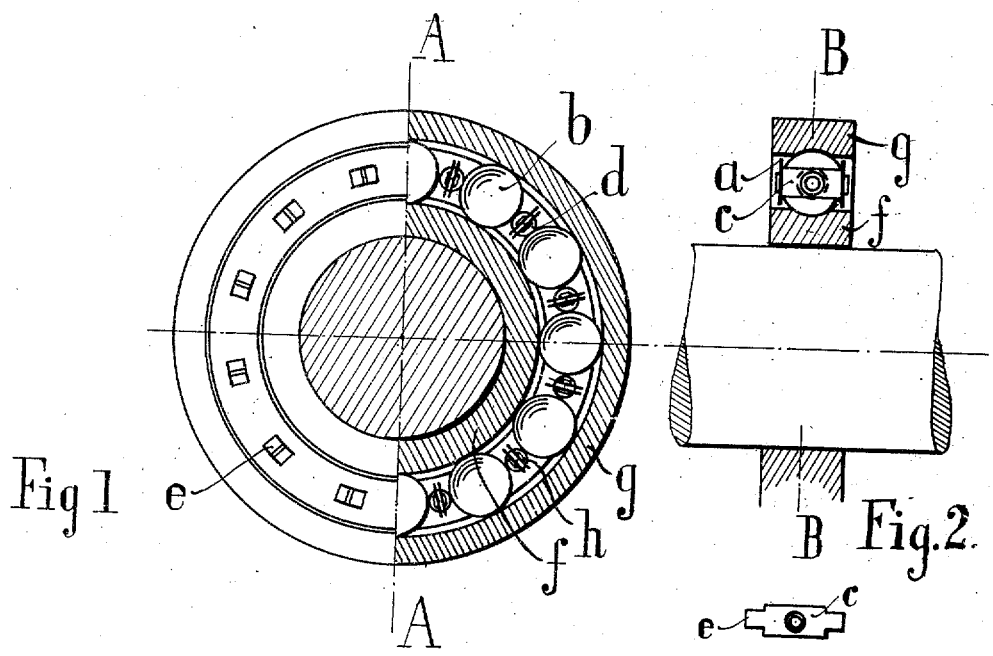
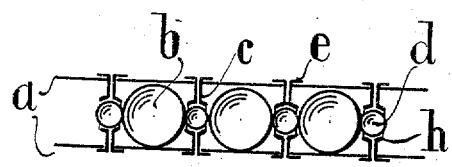
Inventor.
Friedrich Greiner,
by Franks Appleman,
Atty.
Witnesses
L. E. Barkley
L. A. Sands

UNITED STATES PATENT OFFICE.

FRIEDRICH GREINER, OF BERLIN, GERMANY, ASSIGNOR TO THE FIRM OF MASCHINENBAU-ANSTALT ALTENESSEN, A. G., OF ALTENESSEN, GERMANY.

BALL-BEARING.

No. 874,401.　　　Specification of Letters Patent.　　Patented Dec. 24, 1907.

Application filed July 23, 1907. Serial No. 385,144.

*To all whom it may concern:*

Be it known that I, FRIEDRICH GREINER, a subject of the German Emperor, and residing at Nachodstrasse 39, Berlin, Germany, have invented certain new and useful Improvements in Ball-Bearings, of which the following is a specification.

The present invention relates to a ball-bearing consisting of an inner ring, an outer ring, large balls between the two rings, smaller balls between the individual large balls and a supporting device for the balls.

The invention consists substantially in the constructive formation of this supporting device in such a manner that it can be made by stamping in the simplest manner and without complicated swages and be put together without the help of screws, rivets and the like.

The ball-bearing is represented in the drawing in 4 figures.

Figure 1 is an elevation partly in section; Fig. 2 is a longitudinal section in the plane A—A of Fig. 1; Fig. 3 shows a development of the supporting device alone, and Fig. 4 shows one bridge of this supporting device.

The ball-bearing consists of the inner ring $f$, the outer ring $g$ and the large carrying balls $b$ situated between them. Between these balls $b$ there are smaller balls $d$ which serve for converting the sliding friction between the large balls into rolling friction. The supporting device consists of two sheet-metal rings $a$ which cover the annular space between the two ball races and which are connected by a number of cross-pieces or bridges arranged at right angles to them. The bridges consist of two bars $c$ beside one another which have a hole in the center and carry small pins $e$ at their ends. The rings $a$ have slots corresponding to these pins $e$ and can therefore be placed on the bridges $c$, whereupon the little pins $e$ are bent over. The small balls $d$ are arranged between the two bars $c$ of each bridge. The holes in the bars $c$ are splayed and the edges $h$ of the holes serve as guides for the small balls.

What I claim as my invention and desire to secure by Letters Patent is:—

1. A ball-bearing comprising in combination an inner ring, an outer ring, large balls in the annular space between said rings, two flat rings having a plurality of slots arranged between said rings covering said balls in said annular space, a plurality of bridges having holes and small pins on their ends arranged between said balls and at right angles to said flat rings, said pins passing through said slots and connecting said flat rings together, and small balls in said holes between said large balls.

2. A ball-bearing comprising in combination an inner ring, an outer ring, large balls in the annular space between said rings, two flat rings having a plurality of slots arranged between said rings covering said balls in said annular space, a plurality of bars in pairs arranged between said balls and at right angles to said flat rings and passing through said slots connecting said flat rings together, said bars having holes at their centers being splayed about the holes and having small balls in said holes between said large balls.

In testimony whereof, I affix my signature in the presence of two witnesses.

FRIEDRICH GREINER.

Witnesses:
　HENRY HASPER,
　WOLDEMAR HAUPT.